(12) United States Patent
Zhou et al.

(10) Patent No.: US 6,178,456 B1
(45) Date of Patent: Jan. 23, 2001

(54) METHOD OF COMMUNICATING BETWEEN A PERSONAL COMPUTER AND A SERVICE PROVIDER

(75) Inventors: Yan Zhou; Paul R. Teich, both of Austin, TX (US)

(73) Assignee: Advanced Micro Devices Inc., Sunnyvale, CA (US)

( * ) Notice: Under 35 U.S.C. 154(b), the term of this patent shall be extended for 0 days.

(21) Appl. No.: 08/915,570

(22) Filed: Aug. 21, 1997

Related U.S. Application Data

(60) Provisional application No. 60/040,117, filed on Mar. 7, 1997.

(51) Int. Cl.$^7$ .................................................. G06F 15/177
(52) U.S. Cl. ............................................ 709/228; 709/232
(58) Field of Search .................................. 709/207, 208, 709/229, 230, 232

(56) References Cited

U.S. PATENT DOCUMENTS

| | | | |
|---|---|---|---|
| 4,879,742 | * | 11/1989 | Taniguchi et al. ................... 379/111 |
| 5,305,318 | * | 4/1994 | Ozeki et al. ......................... 370/431 |
| 5,452,287 | * | 9/1995 | DiCecco et al. ..................... 370/236 |
| 5,742,772 | * | 4/1998 | Sreenan ............................ 395/200.58 |
| 5,826,027 | * | 10/1998 | Pedersen et al. .................... 709/227 |
| 5,956,729 | * | 9/1999 | Gotez et al. ......................... 707/104 |

* cited by examiner

Primary Examiner—Dung C. Dinh
(74) Attorney, Agent, or Firm—Foley & Lardner

(57) ABSTRACT

A method of communicating from a personal computer via an internet by way of a service provider. The method includes transmitting, in a first frame from the personal computer to the service provider, an indicator to indicate one of a new bandwidth assignment and a default bandwidth assignment, a personal computer transmission format, and a description of personal computer capabilities. In a second frame, the service provider transmits to the personal computer an acknowledgement of the new bandwidth assignment when received and a service provider transmission format. In a third frame, the service provider transmits to the personal computer information according to the service provider transmission format and the personal computer capabilities. In a fourth frame, the personal computer transmits to the service provider information according to the personal computer transmission format.

4 Claims, 5 Drawing Sheets

METHOD OF COMMUNICATING BETWEEN A PERSONAL COMPUTER AND A SERVICE PROVIDER

RELATED APPLICATIONS

This application claims priority to provisional application Ser. No. 60/040,117, filed Mar. 7, 1997.

BACKGROUND OF THE INVENTION

1. Field of the Invention

This invention relates to a method of communicating between an end station and a service provider or the like. More specifically, this invention relates to a method of achieving efficiency in communications between an end station, such as a personal computer, and a service provider via the internet or other communications system.

2. Related Art

Advancements in the data communications industry have enabled personal computer users to communicate with the outside world from inside their homes. Personal computers communicate with service providers via modems, integrated services digital network (ISDN) ports, or other high speed ports. Persons in the data communications industry have even contemplated using asynchronous transfer mode (ATM) technology to send high speed multimedia data, including video and audio data, to household personal computers. However, current ATM technology requires too much overhead for use with personal computers as will be more fully described below.

Communication methods fall into two general categories. The first form of communication, such as communication via modems and the like, dedicates an entire communications channel to only one task. This form of communication method cannot support multiple-type signal transmissions simultaneously because the frame transmitting the data does not carry source and destination address information in its header. The second form of communication, such as ATM communication systems and the like, includes sophisticated source and destination address information in the frame header and, thus, has the capability to send data simultaneously to many different destinations. This second form of communication, however, requires a somewhat large amount of channel capacity to carry the address and control information. In ATM communication systems, transmissions typically include a large, global header followed by a series of frames, each having its own header address for the data transmitted in the frame. The address and control information in the global header alone occupies approximately 10% of the channel capacity. Where unnecessary to achieve communication between network devices, carrying the address and control information results in inefficient communication and data transfer between network devices.

Millions of users communicate with services, such as a multimedia carrier or the internet, from their homes over their personal computers. For those users, the most efficient communication method would define a protocol specific to their home computer and the service provider, including address information and other information necessary to establish the communication. This would eliminate the burden of carrying useless address or control information over the communication channel which the user does not need for the particular task. The service provider could then translate each individual user's needs, and connect the user to a local service or assign the user a new address to enable connection to the next layer service.

The difficulties suggested in the preceding are not intended to be exhaustive-but rather are among many which tend to reduce the efficiency of prior methods of communication between personal computers and service providers. Other noteworthy problems may also exist; however, those presented above should be sufficient to demonstrate that such methods appearing in the past will admit to worthwhile improvement.

SUMMARY AND OBJECTS OF THE INVENTION

Accordingly, it is therefore a general object of the invention to provide a method of communication between a personal computer and a service provider which will obviate or minimize difficulties of the type previously described.

It is a specific object of the invention to provide a method of communication between a personal computer and a service provider which eliminates complicated address and control information from frame headers in those communication methods using headers to direct data traffic.

It is another object of the invention to provide method of communication between a personal computer and a service provider which increases the efficiency of data transfer.

It is still another object of the invention to provide a method of communication between a personal computer and a service provider which enables communication based on a mutually agreed upon protocol.

It is yet a further object of the invention to provide a method of communication between a personal computer and a service provider which enables conversion to an appropriate communication scheme according to the quality of the data transfer.

A preferred embodiment of the invention which is intended to accomplish at least some of the foregoing objects includes a method of communicating from a personal computer via an internet by way of a service provider. The method comprises the steps of transmitting, in a first frame from the personal computer to the service provider, an indicator to indicate one of a new bandwidth assignment and a default bandwidth assignment, a personal computer transmission format, and a description of personal computer capabilities; transmitting, in a second frame from the service provider to the personal computer, an acknowledgement of the new bandwidth assignment when received and a service provider transmission format; transmitting, in a third frame from the service provider to the personal computer, information according to the service provider transmission format and the personal computer capabilities; and transmitting, in a fourth frame from the personal computer to the service provider, information according to the personal computer transmission format.

BRIEF DESCRIPTION OF THE DRAWING

Other objects and advantages of the present invention will become apparent from the following detailed description of a method according to the invention taken in conjunction with the accompanying drawings, in which.

DETAILED DESCRIPTION OF THE INVENTION

Figure 1:
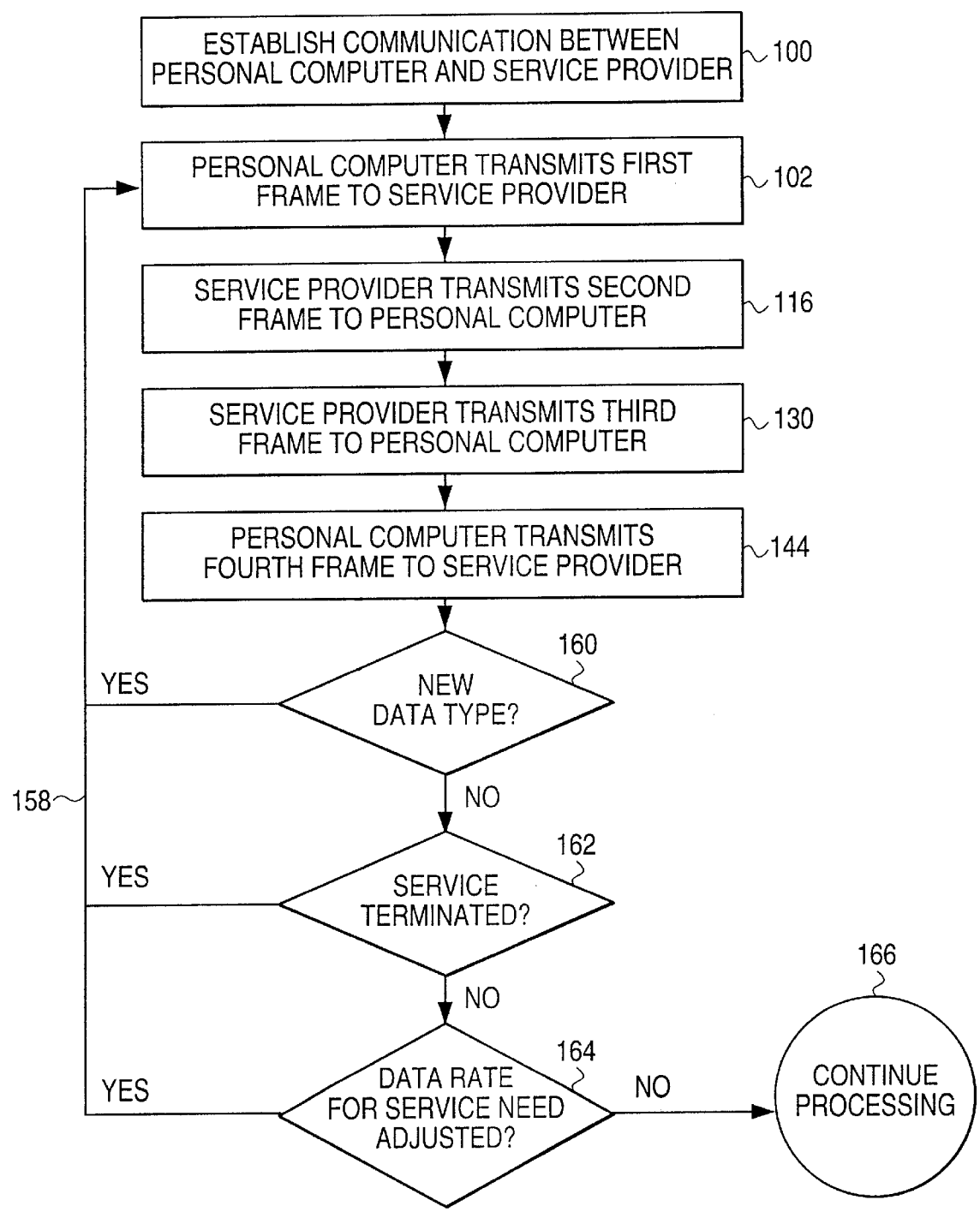
FIG. 1 shows a flow diagram of a method of communication between a personal computer and a service provider.

Referring now to the drawings, wherein like numerals indicate like parts, and initially to FIG. 1, there will be seen a flow diagram illustrating a method of communication between software in a personal computer and a service provider for services such as those available on the internet. Personal computers may have different user protocols and different processing capabilities. Software used by a personal computer communicates with the central processing unit (CPU) of the personal computer to identify itself for communication with the network services. Software used by the user identifies itself, and distinguishes itself from other software, in several ways. Some software must connect to a remote network. Software also has a mean speed of communication for initialization and a data rate requirement for data communications from the personal computer to the service provider. Software also has address information which may be provided by the CPU at computer initialization for peripherals associated with the software, such as a video card or an audio card.

The subject invention permits communication between a personal computer and a service provider based on, for example, the processing capabilities of the personal computer and the transmission characteristics of the personal computer, the service provider, and the communication lines linking them.

In the subject method for communicating between a personal computer and a service provider, FIG. 1 shows in box 100 establishing communication between a personal computer and a service provider. After communication between the two is established, box 102 shows transmitting a first frame from the personal computer to service provider. The first frame contains information relating to the personal computer's protocol and information identifying how the personal computer will send information to the service provider.

Figure 2:
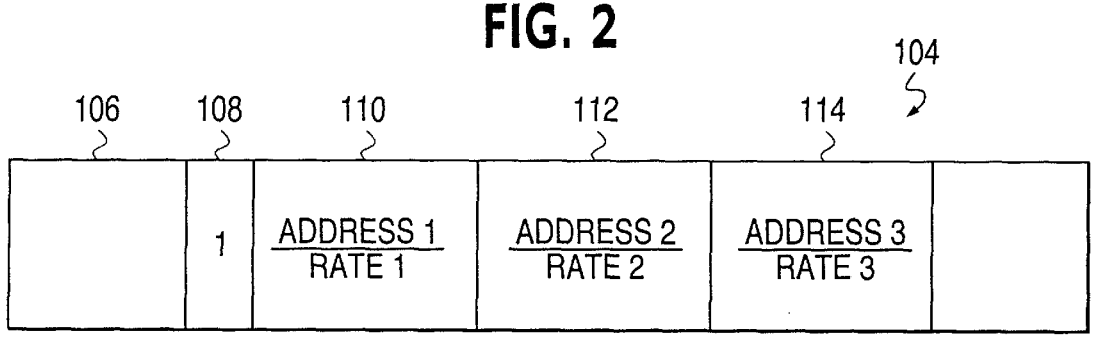
FIG. 2 shows a schematic of a first frame according the invention.

A preferred embodiment of the data structure of a first frame, generally indicated 104, is shown in FIG. 2. First frame 104 carries information including an indicator to indicate whether a new bandwidth assignment is needed for communication with the service provider, a personal computer transmission format, and a description of the personal computer's capabilities. More specifically, a series of bits, indicated by box 106, is devoted to establishing synchronization and handshakes between nodes in a network. At least one indicator bit 108 indicates whether the communication requires a new address or bandwidth assignment. For example, a 1 may indicate that a new address or bandwidth is necessary, and a 0 may indicate that a change is not required. Data information generally follows the indicator bit 108. When bit 108 is 1, the data information includes address information and an estimation of the data rate for communications between the personal computer and the service provider. For example, boxes 110, 112, and 114 represent series of bits where box 110 carries address and rate information for a first type of data, box 112 carries address and rate information for a second type of data, and box 114 carries address and rate information for a third type of data. This information is sent to the service provider.

Upon receipt of the first frame, the service provider transmits a second frame to the personal computer which includes an acknowledgement of any new bandwidth assignment and a service provider transmission format, as shown in box 116. In this manner, the service provider tells the personal computer in what format the service provider will send information to the personal computer. Generally, the rate that the service provider will deliver information to software in the personal computer differs from the rate that the personal computer sends information to the service provider.

Figure 3:
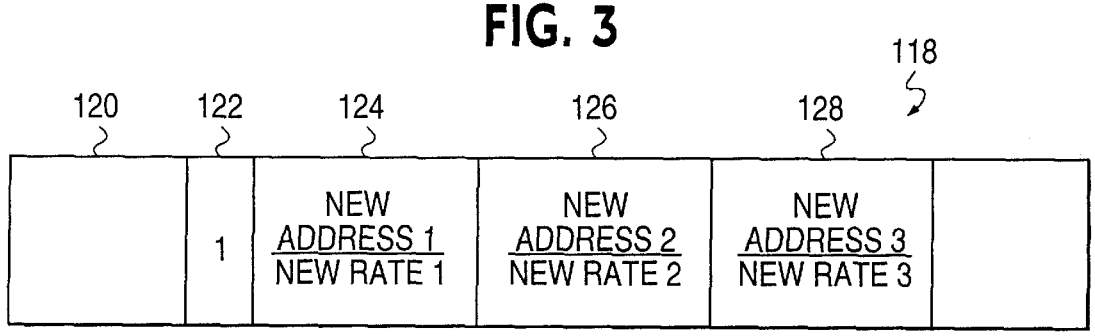
FIG. 3 shows a second frame according to the invention.

FIG. 3 shows a preferred embodiment of the data structure of second frame, generally indicated 118. The service provider provides a data length assignment according the personal computer's software data rate requirement and the service provider's own transmission format. More specifically, a series of bits, generally indicated by box 120, is devoted to establishing synchronization and handshakes between nodes in a network. At least one indicator bit 122 indicates whether the communication requires a new data rate based on the data rate requirements of the software running on the personal computer. For example, a 1 may indicate that a new data rate change is necessary, and a 0 may indicate that a change is not required. In this example, indicator 122 is a 1, so that the service provider will assign a new data rate to the data to be transmitted to the personal computer. Data information generally follows the data rate indicator 122. The accompanying data information includes address information and data rate and data length information assigned by the service provider for each type of data. For example, boxes 124, 126, and 128 represent series of bits where box 124 carries address and rate information for the first type of data, box 126 carries address and rate information for the second type of data, and box 128 carries address and rate information for the third type of data. This information, representing the service provider transmission format, is sent to the personal computer.

Figure 4:
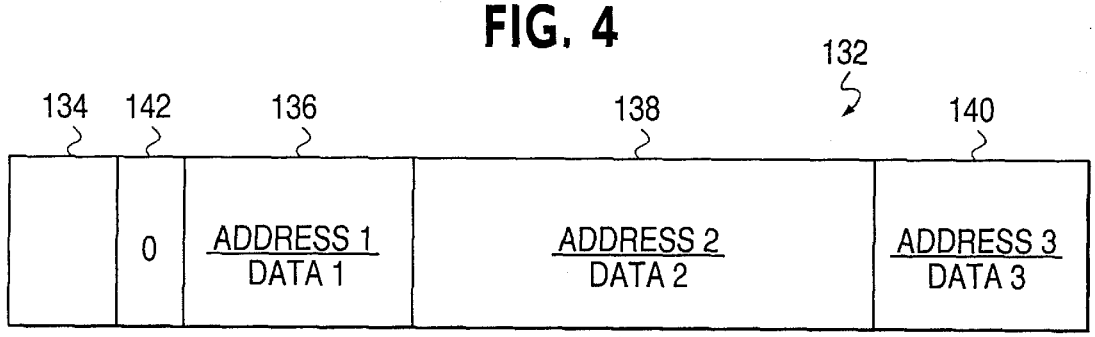
FIG. 4 shows a third frame according to the invention.

After the above information is received by the personal computer, the service provider sends the data in a third frame to the personal computer as shown in box 130 of FIG. 1. FIG. 4 shows a preferred embodiment of the third frame, generally indicated 132, sent by the service provider to the personal computer according to the personal computer's capabilities. The third frame 132 includes synchronization and hand shake bits 134, as well as address information and the data, as shown in boxes 136, 138, and 140. The data length, which differs according to the type of data sent, is assigned based on the service provider's transmission format and the personal computer's processing capabilities. In this example, the 0 representing indicator 142 indicates that no new data length assignment or data rate assignment is necessary.

Figure 5:
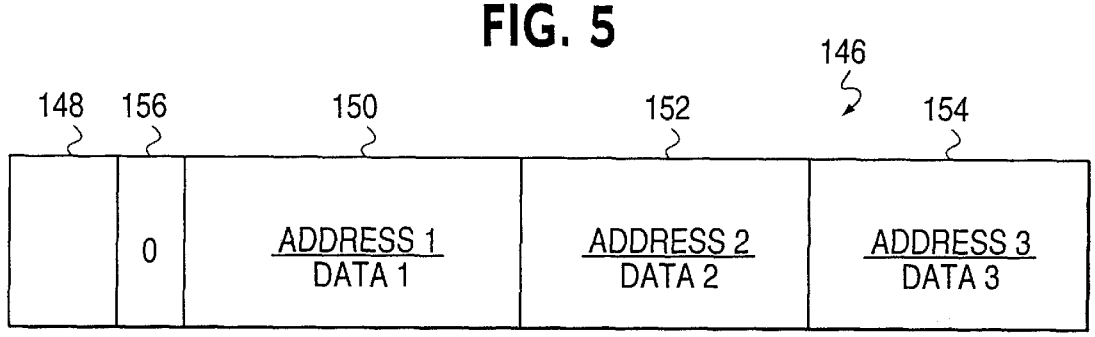
FIG. 5 shows a fourth frame according to the invention.

Upon receipt of information from the service provider, the personal computer may send data in a fourth frame to the service provider as shown in box 144 of FIG. 1. The data length sent from the personal computer to the service provider is assigned by the personal computer according to the data rate from the personal computer to the service provider. FIG. 5 shows a preferred embodiment of the fourth frame, generally indicated 146. The data length of the data carried in boxes 150, 152, and 154 differ from boxes 136, 138, and 140 in third frame 132. The fourth frame includes synchronization and hand shake bits 148, and an indicator bit 156 indicating whether a new data length or a new data type is required. Here, indicator 156 indicates that no new data length or type is required for transmissions from the personal computer to the service provider.

Steps 102, 116, 130, and 144 may be repeated as shown by line 158 if a new data type is added in step 160, if one of the previous services is terminated in step 162, or if the data rate for a service needs to be adjusted in step 164. Otherwise, processing continues as shown by step 166.

Figure 6:
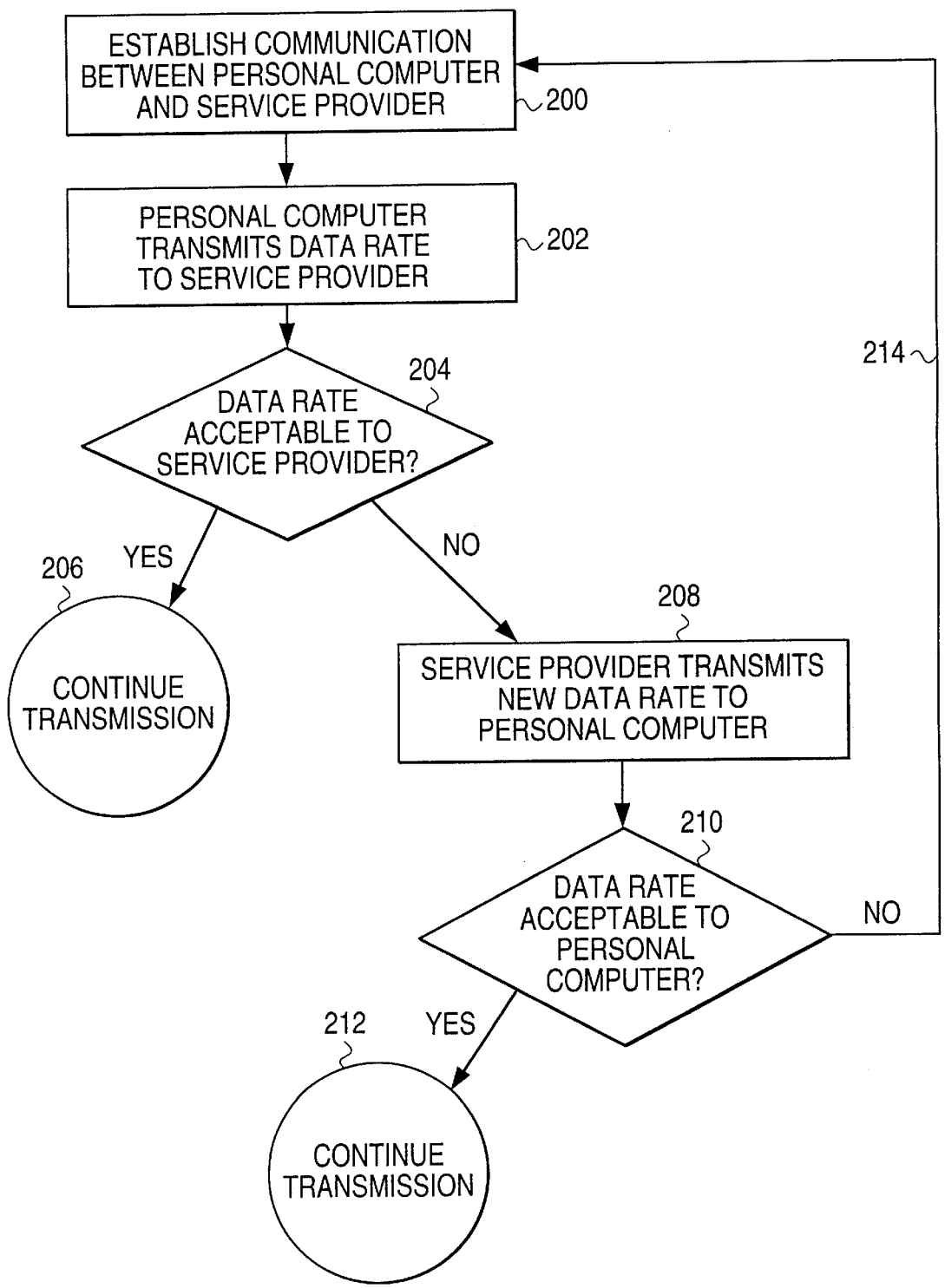
FIG. 6 shows a flow diagram of a second embodiment of the method of communication in accordance with the invention.

The subject method of communication may be sender-based in the sense that the sender system informs the receiver system what type of information it will send and how it will be sent. For example, FIG. 6 shows one embodiment of the invention in which a personal computer establishes a connection with a service provider as shown in box 200. The personal computer transmits to the service provider the data rate for information sent by the personal computer to the service provider in box 202. In box 204, the service provides then determines asks whether this data rate is acceptable. If it is acceptable, the personal computer transmits the data as shown in box 206. Otherwise, the service provider transmits to the personal computer a new data rate acceptable to the service provider in box 208. The personal computer then determines if the new data rate is acceptable and corresponds to its processing capabilities in box 210. If so, then the personal computer and the service provider transmit data at the mutually agreed upon data rate as shown in box 212. If not, the personal computer establishes connection with another service provider, as shown by feedback line 214, and negotiation over the data rate in steps 200 through 210 resumes again.

It will be understood that negotiation of the data rate preferably occurs between periods of data exchange. Moreover, those of skill in the art will understand that negotiation of other communication parameters may follow the same method in accordance with the invention. For example, a personal computer and a service provider may negotiate over signaling or modulation, with the sender system presenting the initial proposal, and the receiver system either accepting the proposal or rejecting it and transmitting a new proposal to the sender.

Figure 7:
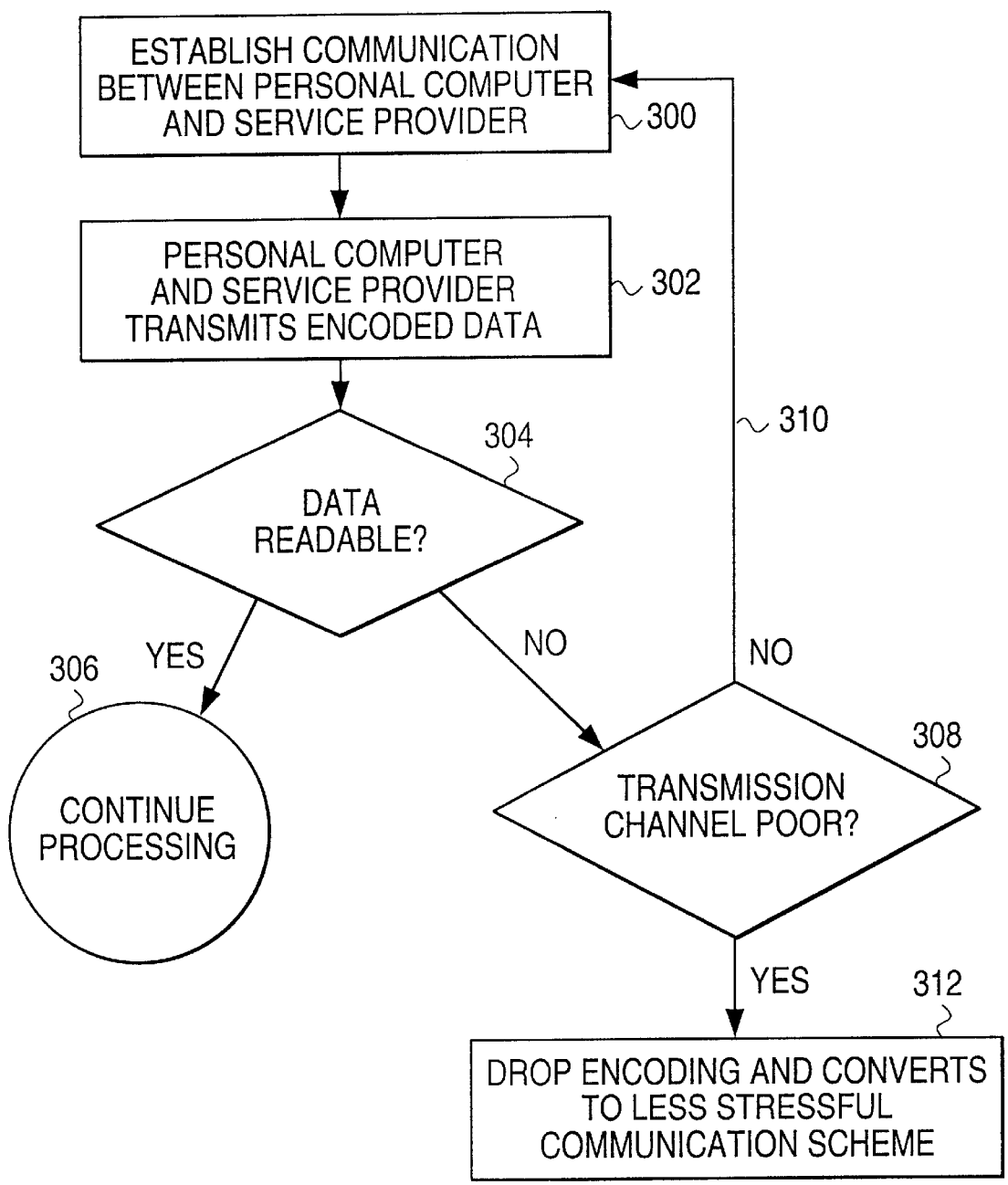
FIG. 7 shows a flow diagram of a third embodiment of the method of communication in accordance with the invention.

FIG. 7 shows a third embodiment of the invention. In box 300, a personal computer establishes connection with a service provider. The personal computer then transmits encoded data to the service provider in box 302. Encoding the data compresses it and makes data transmission more efficient. Upon receipt of the data, the service provider determines if the data is readable as shown in box 304. If the data is readable, the service provider continues to process the data in box 306. If not, in box 308, the service provider determines if the channel transmission is poor. If the channel is not poor, then the personal computer establishes connection with another service provider, as shown by feedback line 310, and communication steps 300 through 304 resume again. If the channel is poor, the service provider transmits a signal to the personal computer indicating to drop the encoding and convert to a less stressful communication scheme, such as a binary system, as shown in box 312.

Figure 8:
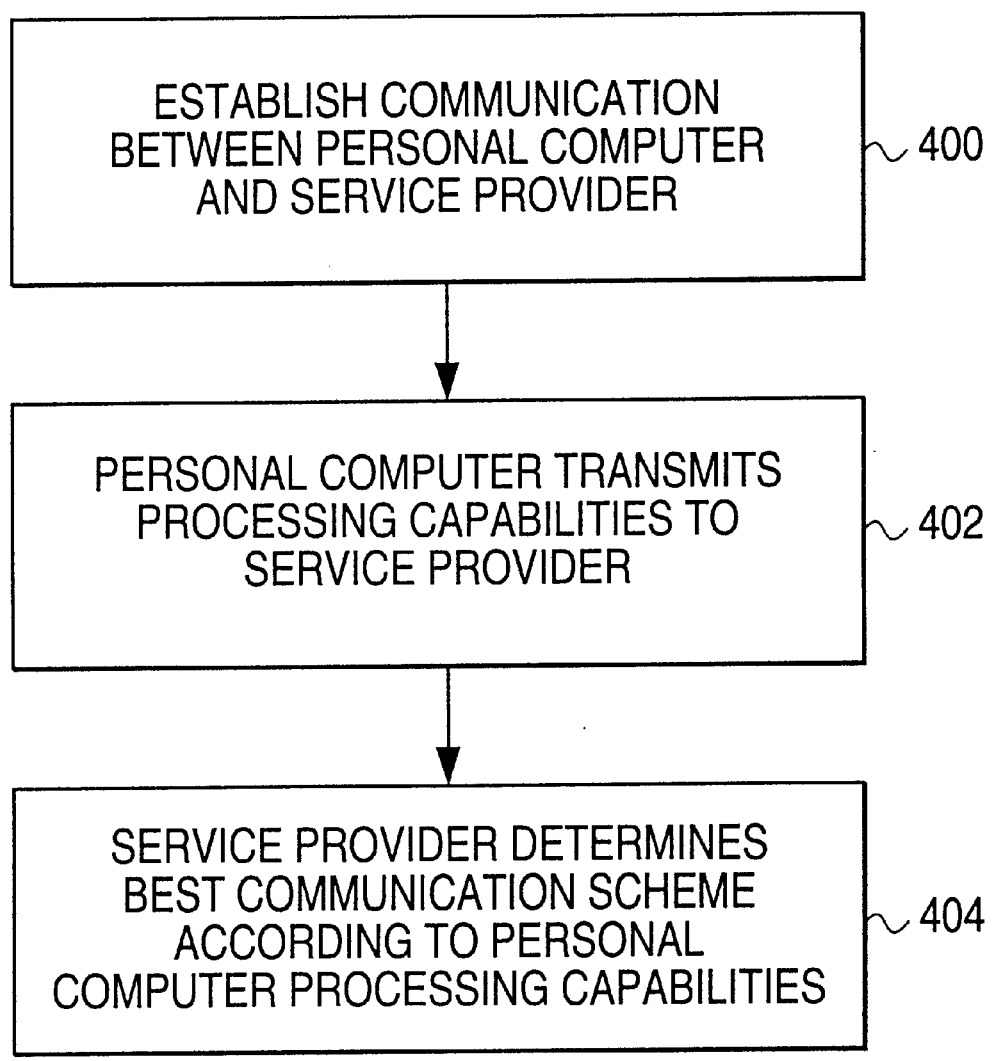
FIG. 8 shows a flow diagram of a fourth embodiment of the method of communication in accordance with the invention.

A fourth embodiment of the invention is shown in FIG. 8. Initially, a personal computer establishes connection with a service provider in box 400. The personal computer then transmits to the service provider the processing capabilities of the personal computer in box 402. The service provider then decides the best way to transmit data to the personal computer based on the personal computer's processing capabilities as shown in box 404.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

What is claimed is:

1. A method of communicating from a personal computer via an internet by way of a service provider, the method comprising the steps of:

transmitting, in a first frame from the personal computer to the service provider, an indicator to indicate one of a new bandwidth assignment and a default bandwidth assignment, a personal computer transmission format, and a description of a plurality of different personal computer processing capabilities, the plurality of different personal computer capabilities including a first set of address and rate information for processing a first type of data, and as second set of address and rate information for processing a second type of data;

transmitting, in a second frame from the service provider to the personal computer, an acknowledgement of the new bandwidth assignment when received and a service provider transmission format, the service provider transmission format including a third set of address and rate information for the first type of data, and a fourth set of address and rate information for the second type of data;

transmitting, in a third frame from the service provider to the personal computer, information according to the service provider transmission format and the plurality of different personal computer processing capabilities; and transmitting, in a fourth frame from the personal computer to the service provider, information according to the personal computer transmission format, wherein a data length that differs according to whether data is the first type of data or the second type of data is sent in the third frame based on both the service provider transmission format and the personal computer processing capabilities.

2. A method as defined in claim 1 and further comprising the step of:

determining the service provider transmission format based on the personal computer processing capabilities, the service provider performing the determining step.

3. A data communication method for negotiating the data rate of data transmitted between a personal computer and a service provider, the method comprising the steps of:

establishing a connection between the personal computer and the service provider;

transmitting in a first frame the data rate from the personal computer to the service provider;

determining the acceptability of the data rate by the service provider;

transmitting in a second frame data between the personal computer and the service provider when the data rate is acceptable;

transmitting in a third frame a new data rate from the service provider to the personal computer when the data rate is unacceptable;

determining the acceptability of the new data rate by the personal computer;

transmitting in a fourth frame data between the personal computer and the service provider when the new data rate is acceptable; and establishing connection between the personal computer and a second service provider when the data rate is unacceptable.

4. A method of establishing communication between a personal computer and a service provider, the method comprising the steps of:

establishing a communication between the personal computer and the service provider over a communication channel;

sending encoded data from the personal computer to the service provider using a first encoding scheme;

receiving the encoded data by the service provider and determining of the encoded data is readable;

if the encoded data is readable, continuing the communication between the personal computer and the service provider;

if the encoded data is not readable, determining by the service provider if channel transmission characteristics of the communication channel are below a preset value;

if the encoded data is not readable and the channel transmission characteristics are below the preset value, transmitting a signal from the service provider to the personal computer to request that the personal computer stop the encoding of data using the first encoding scheme and to use a second encoding scheme that is less complex than the first encoding scheme; and if the encoded data is not readable and the channel transmission characteristics are not below the preset value, informing the personal computer to establish a new communication with another service provider since the communication channel between the personal computer and the service provider is not usable for effective data communications.

* * * * *